DIGITAL DELAY SYSTEM FOR DIGITAL MEMORIES

Filed Aug. 6, 1968 5 Sheets-Sheet 1

INVENTOR:
MIKLOS BLASOVSZKY
BY Arthur O. Klein
HIS ATTORNEY

INVENTOR:
MIKLOS BLASOVSZKY

BY Arthur O. Klein
HIS ATTORNEY

INVENTOR:
MIKLOS BLASOVSZKY
BY Arthur O. Klein
HIS ATTORNEY

DIGITAL DELAY SYSTEM FOR DIGITAL MEMORIES

INVENTOR:
MIKLOS BLASOVSZKY
BY Arthur O. Klein
HIS ATTORNEY

INVENTOR:
MIKLOS BLASOVSZKY
BY Arthur O. Klein
HIS ATTORNEY

United States Patent Office 3,553,594

Patented Jan. 5, 1971

3,553,594

DIGITAL DELAY SYSTEM FOR DIGITAL MEMORIES

Miklos Blasovszky, Budapest, Hungary, assignor to Kozponti Fizikai Kutato Intezet, Budapest, Hungary

Continuation-in-part of application Ser. No. 527,244, Feb. 14, 1966. This application Aug. 6, 1968, Ser. No. 756,341

Claims priority, application Hungary, Feb. 18, 1965, MA–1,446

Int. Cl. H03k *5/153, 17/28*

U.S. Cl. 328—129 4 Claims

ABSTRACT OF THE DISCLOSURE

A digital multichannel analyzer for investigating selected intervals in the time spectrum of electrical pulses is provided with facilities for generating a delay interval of arbitrary length before the start of each selected interval. The delay interval is defined by the duration of two independent, discrete-length chains of identical timing pulses which are applied in sequence to binary elements of diminishing order in a suitable register. Switchover between the pulse chains occurs when a first predetermined number of the pulses have been applied to the higher order element and the delay interval concludes when a second predetermined number of the pulses have been applied to the lower order element.

RELATED APPLICATIONS

The instant case is a continuation-in-part of applicant's copending application Ser. No. 527,244, filed Feb. 14, 1966, now abandoned.

BACKGROUND OF THE INVENTION

One advantageous method of investigating the time spectrum of a succession of electrical pulses is to divide the spectrum into overlapping intervals of width $T_A$ in the domain to be investigated, and to measure the desired spectrum interval by interval. Each interval is individually serviced by a digital analyzer having $M=2^N$ time channels, where N is an integer. The resolution of such an analyzer, for a given interval $T_A$, is proportional to the number of channels.

Such analyzers may be provided with faculties to establish an adjustable delay interval $T_I$ from the origin of the spectrum to be investigated to the start of the particular interval $T_A$ to be analyzed; the entire portion of the spectrum between the start of the delay interval and the portion $T_A$ to be measured is bypassed. With this arrangement, the measured interval $T_A$ may be of arbitrary width so that, for an analyzer with a given number of channels, an arbitrary degree of resolution may be obtained.

Unfortunately, presently used analyzers which provide such interval-by-interval measurements are either (1) expensive and complex or (2) inflexible in that the initial delay interval $T_I$ may be set only at an integral multiple of the interval $T_A$ to be measured. In the latter case, it is impossible to insure the overlap of the edges of adjacent measuring intervals to provide complete spectrum coverage.

SUMMARY OF THE INVENTION

The present invention provides, for use with a digital analyzer of the above type, a simple and economical digital arrangement for establishing an initial delay interval that is arbitrary with respect to an integral multiple of the interval to be measured. In an illustrative embodiment, a succession of clock pulses having a period $T_C=T_{A/M}$ are applied sequentially to a relatively high and a relatively low order element of an N=biT binary register. Upon the commencement of the required delay interval $T_I$, for example, the clock pulses are applied to the relatively high, or Zth, order element, so that after $2^{N-Z}$ clock pulses have been applied, an overflow pulse is obtained from the highest, or Nth, order element of the register. A first counter generates a first gating pulse upon the occurrence of a first predetermined number of overflow pulses from the Nth order element. Upon the occurrence of the first gating pulse, the clock pulses are switched from the Zth order element to the lowest, or zero order element of the register. As a result, an overflow pulse now occurs at the Nth order element output for every $2^N$ pulses applied to the lowest order element. A second counter now generates a second gating pulse upon the occurrence of a second predetermined number of overflow pulses. The occurrence of the second gating pulse terminates the delay interval $T_I$ and triggers the start of the measuring interval $T_A$. The occurrence of the next succeeding overflow pulse (i.e., after an additional $2^N$ pulses have been applied to the lowest order element) terminates the measuring interval $T_A$.

BRIEF DESCRIPTION OF THE DRAWING

The nature of the invention and its advantages will appear more fully from the following detailed description taken in conjunction with the appended drawing, in which.

DETAILED DESCRIPTION

Figure 1:
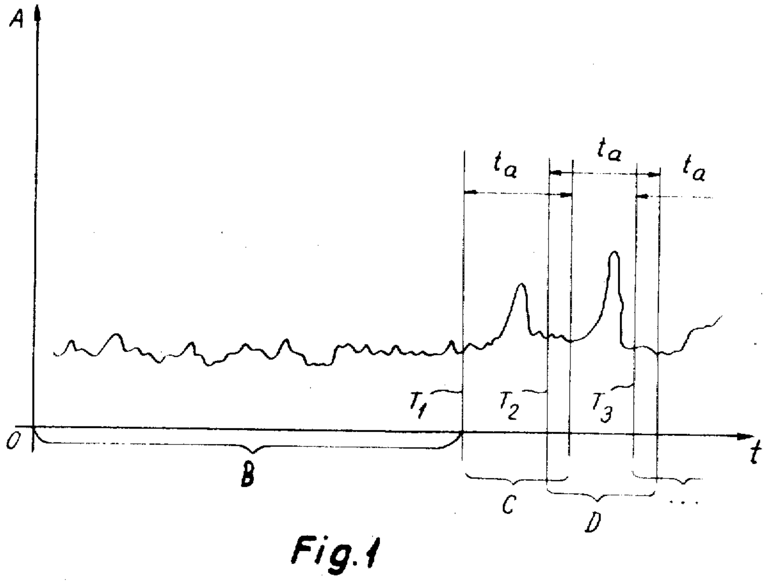
FIG. 1 is a schematic representation of a typical time spectrum separable into discrete intervals to be analyzed.

Referring in more detail to the drawing, FIG. 1 depicts a typical time spectrum of electrical pulses suitable for interval-by-interval analysis with the use of conventional multi-channel digital analyzer techniques. In general, intervals $T_A$ commencing at instants $T_1$, $T_2$, . . . $T_N$ may be analyzed in sequence. The successive intervals $T_A$ overlap so that $T_2-T_1=T_3-T_2<T_A$, where M is the number of time channels in the memory of the digital analyzer. The width of one time channel (i.e., the basic timing interval of the analyzer) will be designated $T_C$, so that $T_A=MT_C$. It will be assumed in the following discussion that the interval $T_A$ to be analyzed is the first one depicted in FIG. 1, i.e., the interval commencing after a delay $T_1$ from the time origin of the pulse spectrum.

Figure 2:
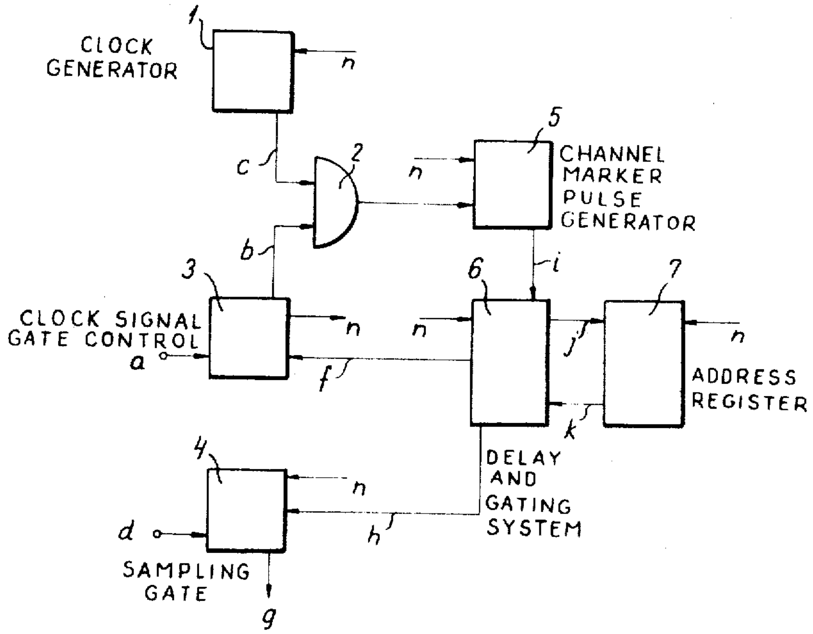
Fig. 2 PRIOR ART
FIG. 2 is a general block diagram of a portion of a multi-channel prior-art digital analyzer suitable for measuring a portion $T_A$ of the time spectrum of FIG. 1 after a prescribed delay.

FIG. 2 shows a portion of a prior-art multi-channel digital analyzer whose construction is known per se. The analyzer is assumed to be set to its initial condition by means of reset pulses N individually applied to the illustrated components. Upon the subsequent application of a starting pulse A to a clock signal gate control 3, an enabling pulse B is applied to one input of an AND gate 2 to permit the passage of trigger pulses C from a clock generator 1 to an input of a channel marker pulse generator 5. In response to the pulses C, the generator 5 produces a sequence of channel marker pulses I occurring at the basic timing rate $T_C$ of the system.

The pulses I are applied to an input of an address register 7 through a delay and gating system 6. (For clarity, the pulses at the output of the gating system 6 are designated J.) Pulses K from an overflow output of the first register 7 are coupled to the gating system 6, which initiates a control pulse H of width $T_A$ upon the occurrence of a predetermined number of the overflow pulses K and, therefore of a predetermined number of pulses J. The interval between the occurrence of the starting pulse A and the initiation of the control pulse H corresponds to the delay interval $T_1$ in FIG. 1. Upon the application of the next succeeding overflow pulse K (FIG. 2) to the gating system 6, the control pulse H is terminated and the gating system 6 generates a Stop pulse F which is applied to the gate control 3 to terminate the enabling pulse B. The gate 2 is thereby disabled, and the application of the channel marker pulses I to the gating system 6 is terminated.

The control pulse H from the gating system 6 is applied to an enabling input of a sampling gate 4. The other input of the gate 4 is coupled to a source of signals D which are made representative of the instantaneous amplitude of of the pulse spectrum of FIG. 1, as by sampling in a conventional manner. Thus during the interval $T_A$ framed by the pulse H, the associated portion of the spectrum of FIG. 1 is gated to a suitable memory (not shown) in the form of signals G for further processing in a suitable manner.

Figure 3:
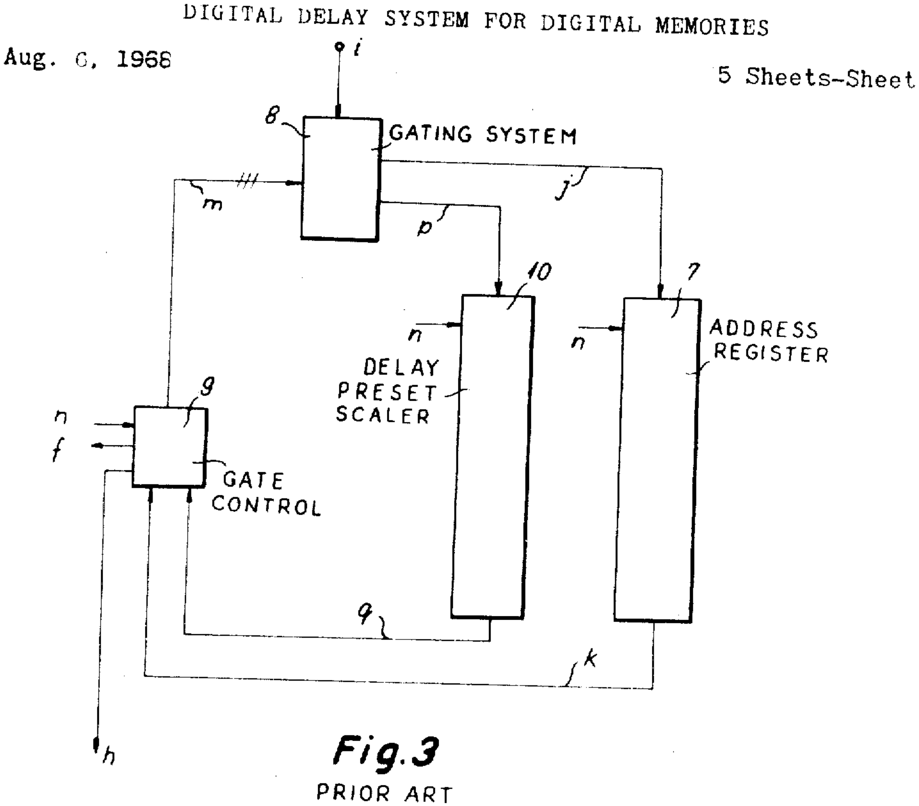
Fig.3 PRIOR ART
FIG. 3 is a block diagram of a first prior art digital delay and interval selection apparatus for use in the arrangement of FIG. 2.

The portion of the prior-art arrangement of FIG. 2 employed in generating the control pulse H is shown in more detail in FIG. 3. In the arrangement of FIG. 3, which is known per se, the pulses I are applied to the input of a gating system 8. The gating system 8 is provided with a pair of outputs individually coupled to the inputs of the address register 7 and a separate delay register 10. Upon the initiation of the delay interval $T_1$ as described above, the pulses I are first applied to the input of the delay register 10 as the pulse series P. After a predetermined number of overflow pulses Q from the output of the delay register 10 has occurred in response to the application of the pulses P to the input thereof, a gate control 9 responsive to the pulses Q (1) initiates the control pulse H to terminate the interval $T_1$ and (2) applies a switching pulse M to the gating system 8, which decouples the pulse P from the delay register 10 and now applies the incoming pulses I to the input of the address register 7 as pulses J. Upon the occurrence of a predetermined number of output pulses K from the register 7 in response to the pulses J applied thereto, the gate control 9 applies a second switching pulse M to the gating system 8, which (a) decouples the pulses I from both the address register 7 and the delay register 10, (b) terminates the control pulse H; and (c) produces the stop pulse F.

The arrangement of FIG. 3 permits any desired delay interval $T_1$ to be utilized before the start of the measuring interval $T_A$ framed by the pulse H, provided only that the number of elements associated with the delay register 10 is large enough. In practice, this latter number of elements is intolerably high and, in addition, the mutually exclusive nature of the operation of the address register 7 and the delay register 10 makes it difficult to assure overlapping of successive intervals $T_A$ in the manner required by FIG. 1.

Figure 4:
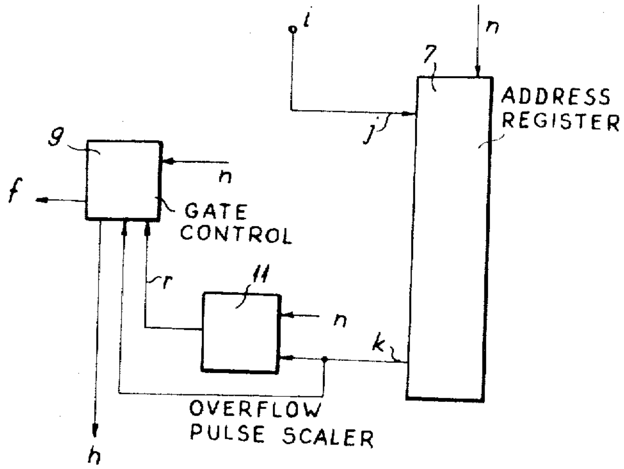
Fig. 4 PRIOR ART
FIG. 4 is a block diagram of a second prior art digital delay and interval selection apparatus for use in the arrangement of FIG. 2.

A modification, also known per se, of the arrangement of FIG. 3 is shown in FIG. 4. In this case the delay register 10 of FIG. 3 has been eliminated and the address register 7 (FIG. 4) also serves the function of the delay register to generate both the delay interval $T_1$ and the measuring interval $T_A$. To accomplish this, the channel marker pulses I are applied initially to a predetermined order input of the address register 7 as pulses J.

Overflow pulses K from the address register 7 are applied to the input of an overflow preset scaler 11. Upon the occurrence of a first predetermined number of the overflow pulses K, the preset scaler 11 couples a gating pulse R to the input of the gate control system 9, which simultaneously triggers the start of the control pulse H. The next succeeding overflow pulse K is applied directly to the gate control 9, which thereupon terminates the control pulse H. As in FIG. 3, the delay interval $T_1$ is commenced at the start of the application of the marker pulses I to the address register 7, and is terminated by the start of the control pulse H.

The number of elements required in the preset scaler 11 of FIG. 4 is much fewer for a prescribed delay $T_1$ than that required in the delay register 10 of FIG. 3. However, since (a) the delay interval $T_1$ in FIG. 4 coincides with the time necessary to obtain an integral number of pulses K and since (b) the interval $T_A$ is essentially equal to the interval between successive ones of the pulses K, it is necessary that the delay interval $T_1$ be an integral multiple of the measurement interval $T_A$. This effectively precludes the use, in many cases, of overlapping successive intervals $T_A$ in the manner shown in FIG. 1.

Figure 5:
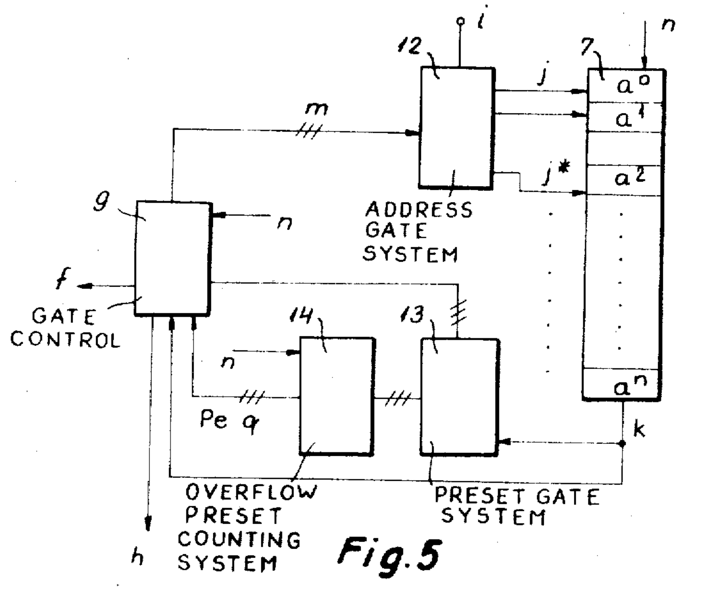
FIGS. 5, 6, and 7 are block diagrams of first, second, and third embodiments, respectively, of digital delay and interval selection apparatus in accordance with the invention.

In accordance with the invention the arrangement of FIG. 5 provides a technique for generating, with a minimum of circuit cost and complexity, the required control pulse H at the conclusion of a selectable delay interval $T_1$ that is not restricted in width to an integral number of intervals $T_A$.

Specific embodiments of the several components shown in FIG. 5, e.g., the gate control 9, the address register 7, an address gate system 12, a preset gate system 13, and a preset counting system 14, are described below in connection with FIG. 8.

As shown in FIG. 5, the marker pulses I are applied through the address gate system 12 to a selectable one of the digit order elements 0, 1, 2 . . . Z, . . . N of the address register 7, which has an N-bit capacity. Overflow pulses K from the highest order output of the address register 7 are applied via the preset gate system 13 to a portion of the preset counting system 14, which applies a pulse to the gate control 9 each time a predetermined number of overflow pulses K are applied thereto through the gate system 13. The overflow output of the address register 7 is also applied to a second input of the gate 9. As before, the gate control 9 is adapted to outpulse at appropriate times (a) the control pulse H; (b) the stop pulse F; and (c) the switching pulses M for the address gate system 12, which is analogous to the gating system 8 of FIG. 3.

The operation of the system of FIG. 5 will now be described. After the system is reset by the pulses N, the application of a starting pulse (not shown) causes the address gate system 12 to couple the marker pulses I to a predetermined Zth order element ($0=K=N$) of the N-bit address register 7 as the pulses J*. Simultaneously, the gate control 9 causes the preset gate system 13 to couple a predetermined output of the overflow preset counting system 14 to the input of the gate control 9. After the occurrence of a first predetermined number of overflow pulses K from the address register 7 in response to the application of the pulses J* applied to the Zth input thereof, the counting system 14 applies a pulse Q to the input of the gate control 9. The latter causes the address gate system 12 to decouple the pulses I from the Zth order element of the address register 7, and couples the pulses I to the lowest or zero order element of the register 7, as the pulses J. At the same time the gate control 9 causes the preset gate system 13 to connect the overflow (i.e., the Nth) output of the address register 7 to another portion of the counting system 14, which generates an output pulse P upon the application thereto of a second predetermined number of the overflow pulses K. The occurrence of the pulse P terminates the delay interval $T_I$ and commences the measuring interval $T_A$ by initiating the start of the control pulse H in the gate control 9. The next overflow pulse K triggers the gate 9 directly to terminate the control pulse H and to produce the stop pulse F.

It will be appreciated that when the pulses J* are applied to the Zth order input of the register 7, an overflow pulse K occurs for each succession of $2^{N-Z}$ pulses J*. Similarly, an overflow pulse K occurs each time $2^N$ pulses J are subsequently applied to the lowest, or zero order input.

Figure 8:
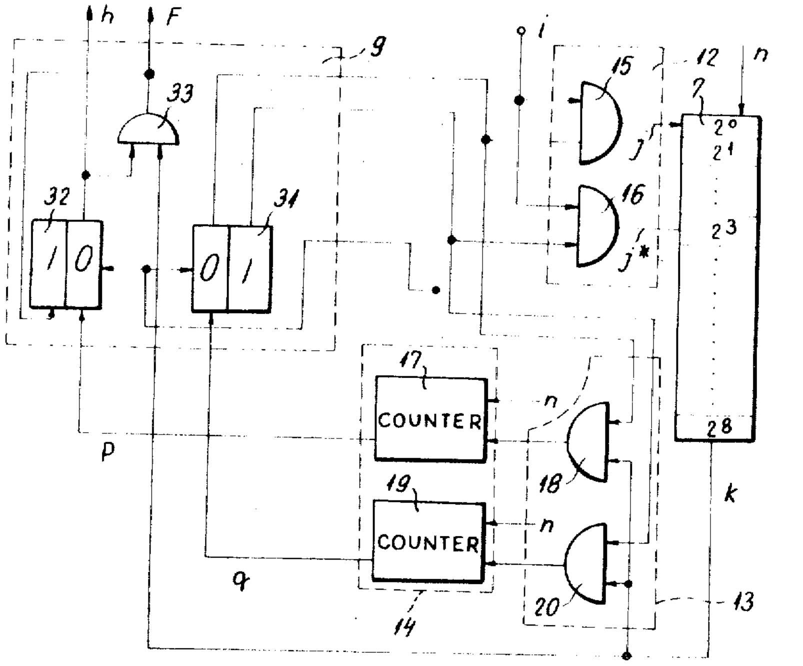
FIG. 8 is a block diagram of one form of the arrangement of FIG. 5.
Figure 9:
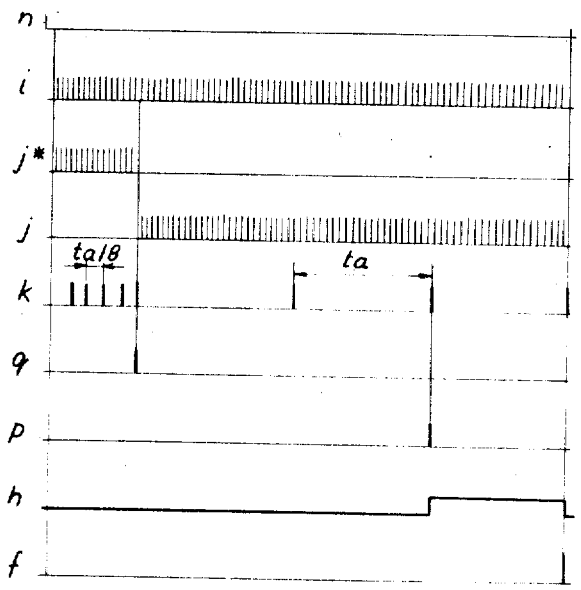
FIG. 9 is a schematic representation of wave forms in various portions of the arrangements of FIG. 8.

To illustrate more clearly the operation of the system of FIG. 5 in the framing of the arbitrary delay interval $T_1$ and the following measuring interval $T_A$, a concrete example is given in FIG. 8 and in the accompanying wave form diagram of FIG. 9. The register 7 (FIG. 8) is assumed to be arranged for 8-bit binary operation ($N=8$), and Z is assumed to be equal to 3 so that $N-Z=5$; i.e., the pulses J* are initially applied to the third order input so that an overflow pulse K occurs at the end of each $2^5$ pulses J*.

The gate control 9 is a conventional arrangement of flip flops 31 and 32 (which are normally in their "one" states) and an AND gate 33. The overflow preset counting system 14 is a pair of separate conventional counters (hereafter sometimes "preset scalers") 17 and 19 arranged to provide the pulses P and Q, respectively, upon the application thereto of two and five overflow pulses K, respectively. The address gate system 12 includes a first pair of AND gates 15 and 16 whose outputs are respectively connected to the zero and third order elements of the register 7. The preset gate system 13 includes a second pair of AND gates 18 and 20 whose outputs are respectively coupled to the inputs of the counters 17 and 19. The "one" output of the flip flop 31 is coupled to the enabling inputs of the AND gates 16 and 20, while the "zero" output of the flip flop 31 is coupled to the enabling inputs of the AND gates 15 and 18. The outputs P and Q of the counters 17 and 19 are coupled to the "zero" inputs of the flip flops 32 and 31, respectively. The pulses H appear on the "zero" output of the flip flop 32. The inputs of the AND gate 33 are the pulses H and K respectively, and the output of the AND gate 33 is the stop pulse F.

The operation of FIG. 8 will now be described. After the resetting of the system of FIG. 8 by the pulses N, the start of the delay interval $T_1$ is initiated by the enabling of the gates 16 and 20 upon the application of an appropriate starting pulse (not shown) to the gate control 9. As a result the marker pulses I are applied through the gate 16 as the pulse series J* to the third order input of the register 7. The resulting overflow pulses K from the 8th order element of the register 7 are applied through the enabled gate 20 to the input of the preset counter 19, which generates the pulse Q after the occurrence of five overflow pulses K; i.e., after $5\times2^5=160$ time units $T_C$ of the analyzer have occurred. The pulse Q switches the state of the flip-flop 31, which thereupon disables the gate 16 and enables the gate 15 to switch the marker pulses I to the lowest or zero order input of the first register 7 as the pulse series J. Simultaneously, the gate control 9 disables the gate 20 and enables the gate 18.

Since the overflow output of the first register 7 is still taken from the 8th order element thereof, an overflow pulse now occurs for each $2^8=256$ pulses of the series J applied to the lowest order input. The resulting overflow pulses K are now applied through the enabled gate 18 to the input of the counter 17, which outpulses a second gating pulse P to the input of the flip-flop 32 after the occurrence of two of the overflow pulses K, i.e., after $2\times2^8=512$ time units $T_C$ of the analyzer have occurred. The pulse P switches the state of the flip-flop 32 to enable the AND gate 33 and to initiate the start of the control pulse H. The next occurring overflow pulse K (i.e., that pulse occurring at the conclusion of an additional 256 pulses of the series J applied to the lowest order input of the register 7) passes through the enabled AND gate 33 to yield the stop signal F, which may be employed to terminate the pulse H in any suitable manner, as by resetting the flip-flop 32.

The total delay interval $T_1$ in the example given in FIG. 8 encompasses $160+512=672$ timing intervals $T_C$. On the other hand, the duration of the control pulse H (i.e. the measuring interval $T_A$) encompasses one additional overflow period of 256 timing intervals. It is seen, therefore, that the delay interval $T_1$ is not necessarily an integral number of measurement intervals $T_A$. At the same time the use of the register 7 of FIG. 8, as both a delay register and an address register minimizes the cost and complexity of the overall arrangement. Hence the invention is seen to provide a simple and economical control means of the above type for providing a delay $T_1$ that is arbitrary with respect to an integral multiple of the measurement interval $T_A$.

Figure 6:
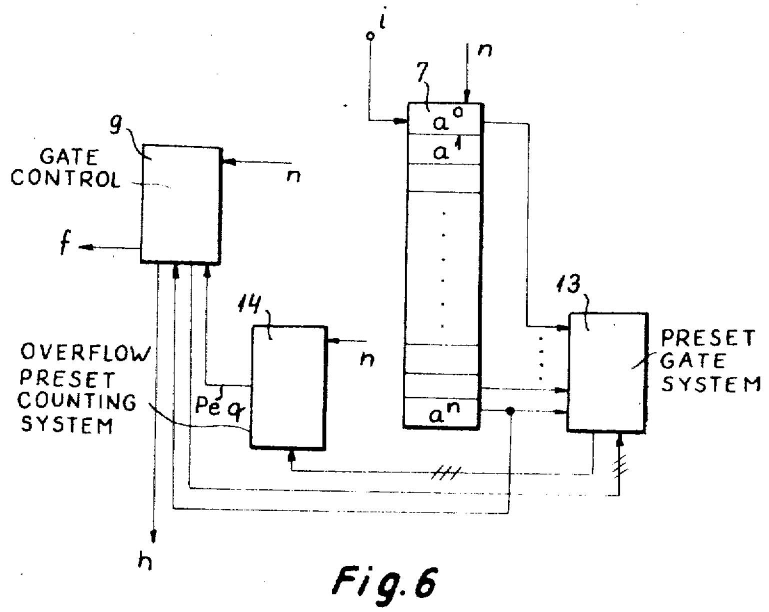

One modification of the arrangement of FIGS. 5 and 8 is depicted in FIG. 6, in which the channel marker pulses I are always coupled to the lowest order input of the register 7 while a plurality of overflow outputs of the register 7 are selectively coupled to the input of the preset gate system 13. Briefly, the system 13 of FIG. 6 couples the overflow outputs of the selected elements of the register 7 to the input of the counting system 14, which supplies the successive gating pulses Q and P to the gate control 9 as in FIGS. 5 and 8. In the case of FIG. 6, however, the switching operation of the gate control 9 serves to couple the outputs, rather than the inputs, of successively lower order elements of the register 7 to the input of the system 13. The remainder of the operation of FIG. 6 is identical to that of FIGS. 5 and 8.

Figure 7:
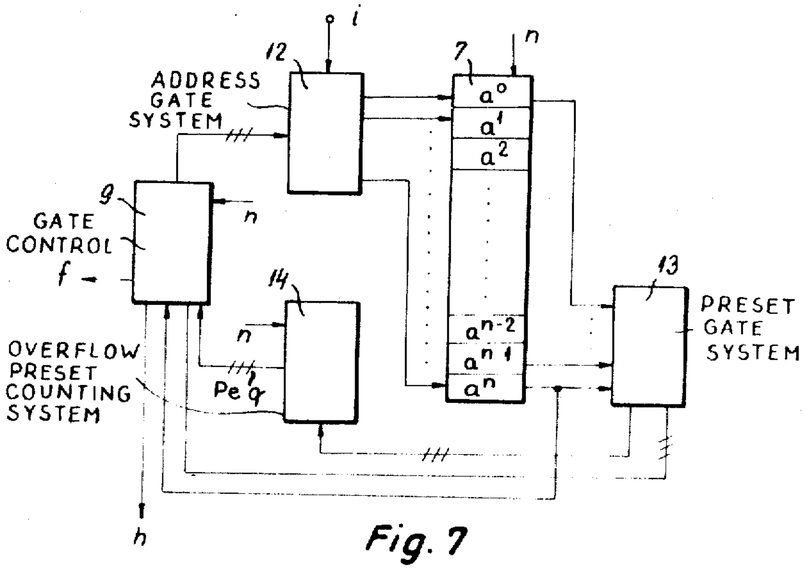

A further modification of the arrangement of FIGS. 5 and 8 is shown in FIG. 7, in which the switching operation of the gate control 9 serves (a) to couple the marker pulses I to the inputs of successively lower order ones of the elements in the register 7 and also (b) to couple the outputs of successively lower order ones of the elements in the register to the input of the preset gate system 13. This embodiment, which effectively combines the features of FIGS. 5, 6 and 8, is otherwise analogous thereto in structure and operation.

In the foregoing, the invention has been described in connection with preferred arrangements thereof. Many variations and modifications will now be apparent to those skilled in the art. It is accordingly desired that the breadth of the appended claims not be limited to the specific disclosure herein contained.

What is claimed is:

1. In a digital apparatus operating with a succession of periodic timing pulses for triggering a control pulse at the conclusion of a predetermined delay interval:

first register means comprising, in combination, a plurality of successive digit order elements and means individually coupling the timing pulses to a selectable one of the elements for generating a succession of overflow pulses from the register of a rate associated with the then selected element;

second register means individually responsive to each succession of overflow pulses from the first register means for generating a unique gating pulse upon the occurrence of a predetermined number of overflow pulses in that succession;

means triggered at the start of the delay interval for initially selecting a predetermined first one of the digit order elements;

means responsive to the gating pulse next occurring after the selection of the first element for selecting a predetermined second one of the elements; and means responsive to the gating pulse next occurring after the selection of the second element for triggering the start of the control pulse.

2. In a digital apparatus operating with a succession of periodic timing pulses for generating a control pulse of predetermined duration at the conclusion of a predetermined delay interval:

register means comprising, in combination, a plurality of successive digit order elements, and means for generating a first pulse upon each overflow of a first predetermined digit order element;

means for applying the timing pulses to the input of a second predetermined digit order element of the register means to generate the first overflow pulses at a first rate;

means for generating a first gating pulse upon the occurrence of a first predetermined number of the first overflow pulses at the first rate;

means responsive to the first gating pulse for switching the timing pulses from the input of the second element to the input of a third predetermined digit order element of the register means to generate the first overflow pulses at a second rate, the third element being of lower order than the second element;

means for generating a second gating pulse upon the occurrence of a second predetermined number of the first overflow pulses at the second rate;

means responsive to the second gating pulse for initiating the control pulse; and means responsive to the first overflow pulse next succeeding the second gating pulse at the second rate for terminating the control pulse.

3. Digital apparatus as defined in claim 2, in which the third element is associated with the lowest order of the register means.

4. Digital apparatus as defined in claim 2, in which the first element is associated with the highest order of the register means.

References Cited

UNITED STATES PATENTS

| | | | |
|---|---|---|---|
| 2,493,627 | 1/1950 | Grosdoff | 328—129X |
| 2,702,367 | 2/1955 | Ergen | 328—129X |
| 2,886,775 | 5/1959 | Gross | 328—129X |

DONALD D. FORRER, Primary Examiner

J. ZAZWORSKY, Assistant Examiner

U.S. Cl. X.R.

307—293; 328—63, 130; 340—172.5